United States Patent [19]

Robbins et al.

[11] Patent Number: 4,461,782

[45] Date of Patent: Jul. 24, 1984

[54] LOW CALORIE BAKED PRODUCTS

[75] Inventors: Medford D. Robbins, Whitewater Township, Franklin County, Ind.; Sheila S. Rodriguez, Cincinnati, Ohio

[73] Assignee: The Procter & Gamble Company, Cincinnati, Ohio

[21] Appl. No.: 348,634

[22] Filed: Feb. 16, 1982

[51] Int. Cl.$^3$ .............................................. A21D 13/00
[52] U.S. Cl. ................................... 426/549; 426/604; 426/612; 426/804
[58] Field of Search ............... 426/549, 551, 553, 601, 426/604, 611, 612, 804

[56] References Cited

U.S. PATENT DOCUMENTS

| | | | |
|---|---|---|---|
| 3,023,104 | 2/1962 | Battista et al. | 426/104 |
| 3,600,186 | 8/1971 | Mattson et al. | 426/611 |
| 4,005,196 | 1/1977 | Jandacek et al. | 426/658 |
| 4,219,580 | 8/1980 | Torres | 426/549 |

FOREIGN PATENT DOCUMENTS 45-2053  1/1970  Japan .................................. 426/804

OTHER PUBLICATIONS

English Translation of Japanese patent No. 0452053, 1/70.

*Primary Examiner*—Robert A. Yoncoskie
*Assistant Examiner*—Elizabeth A. Hatcher
*Attorney, Agent, or Firm*—Jacobus C. Rasser; Steven J. Goldstein; Jack D. Schaeffer

[57] ABSTRACT

Baked products comprising from about 12% to about 60% of a non-absorbable, non-digestible liquid polyol polyester and from about 25% to about 85% microcrystalline cellulose or a mixture of microcrystalline cellulose and flour in a weight ratio cellulose:flour of at least 1:1 have good texture, good mouthfeel, are highly palatable and have a low caloric content.

8 Claims, No Drawings

LOW CALORIE BAKED PRODUCTS

TECHNICAL FIELD

The present invention relates to low calorie baked products comprising non-absorbable, non-digestible liquid polyol polyesters and microcrystalline cellulose.

There is increasing interest in food products having a reduced caloric content, and especially in low-calorie baked goods. Such baked goods are desirable for reducing the caloric intake by obese people and also for preventing unwanted weight gain in normal persons. One approach to reducing the caloric value of baked goods has been to replace part of the flour component with agents which are substantially non-digestible, and therefore non-caloric. For example, various forms of purified cellulose, such as crystalline alpha-cellulose and microcrystalline cellulose, have been proposed as partial flour substitutes. However, the cellulosic flour substitutes can be used up to a replacement level of only about 25%. When these cellulosic flour substitutes are used at replacement levels greater than 25%, the baked goods obtained are of unsatisfactory quality with respect to both taste and texture; they leave a gritty, fibrous feeling in the mouth, which is not obviated by reducing the particle size of the cellulosic material. The adverse mouthfeel may be masked by using substantial amounts of xanthan gum and lecithin. These additives, reportedly, make it possible to replace up to 70% of the flour in baked goods with cellulose. Although it is widely recognized that it would be desirable to further reduce the caloric content of baked goods, prior to this invention it has not been possible to produce baked goods of satisfactory quality with cellulose replacing more than 70% of the flour, or more than 50% in absence of special mouthfeel additives.

Another approach to reducing the caloric content of food products has been to replace triglycerides with non-absorbable, non-digestible liquid polyol polyesters. These polyol polyesters, apart from being a non-caloric fat replacement, have the additional advantage of providing a means for treating hypercholesterolemia. Although it has been recognized that such polyol polyesters might be used to replace the shortening in baked goods, focus thus far has been entirely on traditionally high fat food products like mayonnaise and margarine, where fat replacement results in a much more important reduction in caloric content than in baked products.

Accordingly, it is an object of this invention to provide highly palatable baked goods wherein essentially all the triglycerides are replaced with liquid polyol polyesters and wherein from about 50% to 100% of the flour is replaced with cellulose.

BACKGROUND REFERENCES

The following references provide the background relevant to the present invention.

U.S. Pat. No. 3,023,104, issued Feb. 27, 1962 to Battista, et al., discloses microcrystalline cellulose suitable for use in food products as a flour extender. Examples of baked goods are disclosed wherein from 33% to about 50% of the flour is replaced with cellulose.

U.S. Pat. No. 4,219,580, issued Aug. 26, 1980 to Torres, teaches that the mouthfeel disadvantages associated with the use of cellulose may be off-set by adding xanthan gum and lecithin to the cellulose. It is claimed that these additives make it possible to replace up to 70% of the flour with cellulose, but the disclosed examples are limited to flour replacements of about 50%.

Low calorie food products comprising liquid polyol polyesters are disclosed in U.S. Pat. No. 3,600,186, issued Aug. 17, 1971 to Mattson, et al.

SUMMARY OF INVENTION

The present invention relates to low-calorie baked goods comprising a liquid polyol polyester and, as a second costituent, microcrystalline cellulose, or a mixture of microcrystalline cellulose and flour in a weight ratio of at least 1:1. The liquid polyol polyester makes it possible to replace from about 50% to 100% of the flour without creating an adverse texture or mouthfeel in the product. The present invention thus provides palatable baked goods of almost negligible caloric content, a highly desirable combination of properties which has heretofore been unavailable.

DETAILED DESCRIPTION OF THE INVENTION

The following definitions are used throughout this specification.

By "%" or "percentage" is meant weight percent of the finished baked product unless indicated otherwise. Thereby is water, present in the dough, presumed to evaporate fully during baking and is therefore not taken into account.

By "calorie" herein is meant the large calorie usually employed to indicate the energy content of food (1 large calorie=1000 thermal calories=4.184 kJ).

By "non-absorbable, non-digestible liquid polyol fatty acid polyester" herein is meant a polyol ester having at least 4 fatty acid ester groups, wherein the polyol is selected from the group consisting of sugars and sugar alcohols containing from 4 to 8 hydroxyl groups and wherein each fatty acid group has from about 8 to about 22 carbon atoms.

This invention provides low calorie baked products comprising, as a first constituent, from about 12% to about 60% of a non-absorbable, non-digestible liquid polyol fatty acid polyester and as a second constituent, from about 10% to about 50% by weight of the polyol fatty acid polyester of a fatty acid having a melting point of 37° C. or higher, or esters of such fatty acids, to prevent leakage of said liquid polyester through the anal sphincter; and, as a third constituent, from about 25% to about 85% microcrystalline cellulose, or a mixture of microcrystalline cellulose and flour in a weight ratio cellulose:flour of at least 1:1.

LIQUID POLYESTERS

The liquid polyol fatty acid polyesters employed in this invention comprise certain polyols, especially sugars or sugar alcohols, esterified with at least four fatty acid groups. The polyol polyesters suitable for use herein are those disclosed in detail in U.S. Pat. No. 3,600,186, granted Aug. 17, 1971 to Mattson, et al., incorporated herein by reference. The preparation of polyol fatty acid esters is described in U.S. Pat. No. 2,831,854, granted Apr. 22, 1958 to Tucker, et al., incorporated herein by reference. The preferred polyol polyesters are sucrose hexaoleate, sucrose heptaoleate, sucrose octaoleate, and mixtures thereof.

ANTI-ANAL LEAKAGE AGENTS

By "anti-anal leakage agent" or "AAL agent" herein is meant those materials which prevent frank leakage of the liquid polyesters through the anal sphincter. The natural stool-softening effect of the polyesters is not substantially affected, nor is it a problem.

Fatty acids having a melting point of 37° C. or higher, and ingestible, digestible sources of such fatty acids, effectively inhibit anal leakage of the liquid polyesters. Sources of natural and synthetic fatty acids suitable for use as AAL agent in this invention are disclosed in U.S. Pat. No. 4,005,195, issued Jan. 25, 1977 to Jandacek, the disclosures of which are incorporated herein by reference. Preferred AAL agents for use herein are hydrogenated palm oil, natural and synthetic cocoa butter, and the position specific edible triglycerides described in U.S. Pat. No. 3,809,711, issued May 7, 1974 to Yetter, incorporated herein by reference.

The AAL agent should be present in an amount equaling at least about 10% by weight of the liquid polyester. It is preferred that the AAL agent equals at least about 20% by weight of the liquid polyester to ensure that anal leakage does not occur, even at high ingestion rates. Amounts of AAL agent of more than 50% of the weight of liquid polyester adversely affect the texture and the palatability of the baked goods of this invention, and are to be avoided. Preferred herein are amounts equaling from about 20% to about 30% of the weight of the liquid polyester.

MICROCRYSTALLINE CELLULOSE

Cellulosic materials suitable for use in the baked goods of the present invention are the so-called microcrystalline cellulosic materials. Such materials are typically obtained by acid hydrolysis of natural cellulose. As a result of the acid hydrolysis the degree of polymerization (average number of anhydroglucose units) is from about 125 to about 375, and less than 15% of the material has a degree of polymerization of less than 50 or more than 550. As a result of the hydrolysis and subsequent washing steps, the material has the form of crystallite aggregates having a particle size ranging from about 1 micron to about 300 microns. The preparation of microcrystalline cellulose, and its properties, are disclosed in detail in U.S. Pat. No. 3,023,104, issued Feb. 27, 1962 and incorporated herein by reference. A preferred microcrystalline cellulose for use herein is the material having an average level off degree of polymerization (as defined in the above reference) of 125 to 375 anhydroglucose units and a particle size in the range of less than 1 to 300 microns.

PREFERRED EMBODIMENT OF THE INVENTION

This invention is based upon the discovery that when a liquid polyol polyester is used to replace a substantial part of the triglycerides in a baked goods composition, up to 100% of the flour or starch in the composition may be replaced with microcrystalline cellulose without causing the expected undesirable side effects of cellulose in food products (poor texture, dry, sandy or gritty mouthfeel, etc.). Consequently, the subject matter of this invention encompasses any baked product comprising from about 12% to about 60% of a non-absorbable, non-digestible liquid polyol fatty acid polyester, from about 10% to about 50% by weight of the polyester of an AAL agent, and from about 25% to about 85% of either microcrystalline cellulose or microcrystalline cellulose and flour in a weight ratio of at least 1:1. Examples include bread and cake.

A preferred embodiment of this invention is a low calorie baked product comprising as a first constituent from about 35% to about 60% liquid polyol polyester; from about 10% to about 50% by weight of the polyester of an AAL agent; and from about 25% to about 65% microcrystalline cellulose, or microcrystalline cellulose and flour in a weight ratio cellulose:flour of at least 1:1. The amount of liquid polyol polyester preferably is from about 45% to about 55%. Preferred liquid polyol polyesters are sucrose hexaoleate, sucrose heptaoleate, sucrose octaoleate, and mixtures thereof. The amount of AAL agent preferably is from about 20% by weight to about 30% by weight of the liquid polyol polyester. Preferred AAL agents for use herein are hydrogenated palm oil, natural cocoa butter, synthetic cocoa butter, and mixtures thereof.

The amounts of cellulose or cellulose/flour in the finished baked product of this preferred embodiment ranges from about 25% to about 60% by weight of the finished product, more preferably from about 25% to about 46%. The ratio cellulose/flour may range from about 1:1 to about 100:1, but is preferably from about 3:2 to about 9:1. The type of flour used is not critical. Any food grade flour is suitable for use herein. Examples are wheat flour, corn meal, rye flour, and the like.

Although the above discussed ingredients result in a highly acceptable baked product, the aceptability may be further improved by using minor amounts of taste enhancers like salt, cheese flavor, vanilla, Aspartame ®, and the like. Particularly suitable taste enhancers for cake compositions according to the present invention are spices (e.g. cinnamon or nutmeg), artificial fruit flavorings (like orange, pineapple or banana), artificial chocolate flavoring, and natural ingredients like raisins applesauce, shredded coconut, and the like. The selection of taste enhancers is entirely determined by the result to be achieved and will be apparent to those skilled in the art.

To provide a low calorie bread replacement, from about 2% to about 10% of a vegetable or animal protein may be added to the baked products of this invention. Examples of suitable sources of protein are soy meal, skim milk, buttermilk, casein, and the like. The baked products may further be fortified with heat resistant vitamins and with minerals (e.g., calcium and iron). Other means of using the baked products to improve the nutritious balance of people who ought to reduce their caloric intake will be apparent to those skilled in the art.

EXAMPLE I

A dough was made by mixing the following ingredients.

| | |
|---|---|
| Avicel[1] | 6.2 g |
| Flour[2] | 2.0 |
| Na caseinate[3] | 2.0 |
| NaHCO$_3$ | 0.1 |
| NaCl | 0.1 |
| Liquid SPE[4] | 4.6 |
| Hardened palm oil | 1.2 |
| Buttermilk | 9.7 |

[1]Microcrystalline cellulose from American Viscose Corporation, Philadelphia, PA, a division of FMC Corporation, San Jose, CA.
[2]All purpose Gold Medal flour (wheat flour)
[3]Ultra Supreme Grade
[4]A mixture of sucrose hexaoleate, sucrose heptaoleate and sucrose octaoleate.

First Avicel, flour, sodium caseinate and salt were mixed. Then sucrose polyester and hardened palm oil (premixed) were added and mixed; then buttermilk was added. The dough was formed into wafers and baked at about 220° C. for 8 minutes. The wafers had good consistency, texture, mouthfeel, palatability and taste.

Additional wafers are prepared with a mixture of the tetra-, penta-, hexa-, hepta-, and octa-esters of sucrose and soybean oil fatty acids replacing the sucrose oleate esters. A product of substantially the same quality is obtained.

Wafers are prepared with natural cocoa butter replacing the hardened palm oil. The resulting wafer has good consistency, texture, mouthfeel, palatability and taste.

EXAMPLE II

A low calorie wafer dough of the following composition was prepared.

|  |  |
|---|---|
| Avicel 105[(1)] | 58 g |
| Flour[(1)] | 20 |
| Na caseinate[(1)] | 20 |
| NaCl | 4 |
| Sucrose polyester[(1)] | 82 |
| Hardened palm oil | 20 |
| Buttermilk (10% solids) | 67 |

[(1)]As in Example I

First Avicel, flour, sodium caseinate and salt were mixed. Then sucrose polyester and hardened palm oil (premixed) were added and mixed; then buttermilk was added. The dough was formed into wafers on aluminum baking trays, then baked for 6 minutes at about 220° C. The wafers had good consistency, texture and flavor. No cellulose taste was detectable. The wafers had a caloric content of 0.8 cal/g (about 3.4 kJ/g).

Additional wafers were prepared with Tallawanda distilled water replacing the buttermilk. The dough required a longer baking time: 10 minutes at about 220° C. The wafers thus obtained had good consistency, texture, palatability, mouthfeel, and taste. The resulting product had a caloric content of about 0.7 cal/g (about 3.0 kJ/g).

Wafers are prepared with glucose tetraoleate, sucrose polylinoleate (a mixture of sucrose tetralinoleate, sucrose pentalinoleate, sucrose hexalinoleate, sucrose heptalinoleate and sucrose octalinoleate), xylitolpentaoleate, sorbitol hexalinoleate and glucose pentaricinoleate, respectively, replacing the sucrose polyester. A product of similar texture and eating properties is obtained.

Wafers are prepared with synthetic cocoa butter and behenic acid, respectively, replacing the hardened palm oil. A product of similar quality is obtained.

EXAMPLE III

The following wafer doughs are prepared, according to the method of Example II.

| | A. Amount (g) | | | | |
|---|---|---|---|---|---|
| Avicel 105 | 58 | 44 | 31 | 9 | 22 |
| Wheat flour | — | — | 4 | 9 | 22 |
| Milk protein | — | — | — | 2 | — |
| Na caseinate | 20 | 15 | — | — | 10 |
| NaCl | — | 1 | — | 4 | — |
| Sucrose polyester[(1)] | 35 | 45 | 50 | 55 | 46 |
| Hardened palm oil | 17 | 10 | 15 | 11 | 10 |
| Water | 60 | 60 | 60 | — | 60 |
| Buttermilk | — | — | — | 67 | — |

| | B. Amount (g) | | | |
|---|---|---|---|---|
| Avicel 105 | 45 | 13 | 16 | 6 |
| Wheat flour | 11 | 9 | 10 | 4 |
| Milk protein | — | — | 10 | — |
| Na caseinate | 20 | 10 | — | 15 |
| NaCl | 2 | — | 4 | — |
| Sucrose polyester[(1)] | 35 | 60 | 50 | 55 |
| Hardened palm oil | 7 | 18 | 10 | 15 |
| Water | 60 | 60 | 60 | 33 |
| Buttermilk | — | — | — | 30 |

[(1)]As in Example I

The dough is formed into wafers and baked at 220° C. The wafers have good texture and mouthfeel.

EXAMPLE IV

Cakes are made using sucrose polyester and hardened palm oil (4:1 ratio) microcrystalline cellulose and wheat flour. To the sucrose polyester/palm oil mixture is added an emulsification system comprising 14% propylene glycol monostearate and 2.0% stearic acid (see U.S. Pat. No. 3,145,108). The cake batters have the following formulas:

| Ingredient | Weight (grams) | | | |
|---|---|---|---|---|
| Sugar | 133 | 133 | 133 | 133 |
| Wheat flour | 50 | 26 | 32 | 10 |
| Microcrystalline cellulose | 57 | 80 | 75 | 97 |
| Sucrose polyester | 60 | 60 | 60 | 60 |
| Hardened palm oil | 15 | 12 | 18 | 20 |
| Baking powder | 6.7 | 6.7 | 6.7 | 6.7 |
| Milk | 130 | 130 | 130 | 130 |
| Egg whites | 60 | 60 | 60 | 60 |
| Vanilla | 2.5 | 2.5 | 2.5 | 2.5 |

The doughs are baked in a conventional oven at 180° C. for about 40 minutes. The resulting cakes have good consistency, texture and palatability.

What is claimed is:

1. A low calorie baked product comprising:
   (a) from about 12% to about 60% of a non-absorbable, non-digestible liquid polyol fatty acid polyester;
   (b) as an anti-anal leakage agent, from about 10% to about 50% by weight of the polyol polyester of a fatty acid having a melting point of 37° C. or higher, or an ester of such fatty acids;
   (c) from about 25% to about 85% of a mixture of microcrystalline cellulose and flour in a weight ratio cellulose:flour of from about 3:2 to about 9:1.

2. A low calorie baked product comprising:
   (a) from about 35% to about 60% of a non-absorbable, non-digestible liquid polyol fatty acid polyester;
   (b) as an anti-anal leakage agent, from about 10% to about 50% by weight of the polyol polyester of a fatty acid having a melting point of 37° C. or higher, or an ester of such fatty acids;
   (c) from about 25% to about 60% of a mixture of microcrystalline cellulose and flour in a weight ratio cellulose:flour of from about 3:2 to about 9:1.

3. The low-calorie baked product of claim 2 wherein the amount of anti-anal leakage agent is from about 20% to about 30% by weight of the polyol polyester.

4. The low-calorie baked product of claim 2 wherein the anti-anal leakage agent is selected from the group consisting of hydrogenated palm oil, natural cocoa butter, synthetic cocoa butter, and mixtures thereof.

5. The low-calorie baked product of claim 2 wherein the polyol polyester is selected from the group consisting of sucrose hexaoleate, sucrose heptaoleate, sucrose octaoleate and mixtures thereof.

6. The low-calorie baked product of claim 2 comprising from about 45% to about 55% of the liquid polyol polyester.

7. A low-calorie baked product comprising
 (a) from about 48% to about 55% of a polyol polyester selected from the group consisting of sucrose hexaoleate, sucrose heptaoleate, sucrose octaoleate and mixtures thereof;
 (b) from about 9% to about 16.5% of an anti-anal leakage agent selected from the group consisting of hydrogenated palm oil, natural cocoa butter, synthetic cocoa butter, and mixtures thereof;
 (c) from about 25% to about 46% of a mixture of microcrystalline cellulose and flour in a weight ratio cellulose:flour of from about 3:2 to about 9:1.

8. The low-calorie baked product of claim 7 comprising, as an additional ingredient, from about 2% to about 10% milk protein.

* * * * *